5 Sheets—Sheet 1.

C. H. HERSEY.
Sugar-Molding Machine.

No. 225,601. Patented Mar. 16, 1880.

Witnesses.
Jos. P. Livermore.
L. F. Connor

Inventor.
Chas. H. Hersey.
by Crosby & Gregory, Attys.

C. H. HERSEY.
Sugar-Molding Machine.

No. 225,601. Patented Mar. 16, 1880.

C. H. HERSEY.
Sugar-Molding Machine.

No. 225,601. Patented Mar. 16, 1880.

Witnesses.
Jos. P. Livermore
L. F. Connor

Inventor.
Chas. H. Hersey
by Crosby & Gregory
Attys

C. H. HERSEY.
Sugar-Molding Machine.

No. 225,601. Patented Mar. 16, 1880.

Witnesses
Jos. P. Livermore
L. F. Connor

Inventor.
Chas H. Hersey.
by Crosby & Gregory Atty

UNITED STATES PATENT OFFICE.

CHARLES H. HERSEY, OF BOSTON, MASSACHUSETTS, ASSIGNOR TO CHARLES H. AND FRANCIS C. HERSEY, OF SAME PLACE.

SUGAR-MOLDING MACHINE.

SPECIFICATION forming part of Letters Patent No. 225,601, dated March 16, 1880.

Application filed December 3, 1879.

*To all whom it may concern:*

Be it known that I, CHAS. H. HERSEY, of Boston, county of Suffolk, State of Massachusetts, have invented an Improvement in Sugar-Molding Machines, of which the following description, in connection with the accompanying drawings, is a specification.

This invention relates to mechanism for molding sugar into cubes, and is an improvement on that class of machines wherein the molds are carried by a rotary drum and are filled from a hopper, plungers being used to compress the sugar in the molds.

In this my invention I have placed in the hopper a packing device which crowds the sugar into the molds and levels it therein.

All the plungers of each transverse row of molds are carried by one bar operated by suitable cams, which is more simple, requires less power, and insures greater uniformity of action of the plungers than were each plunger operated independently.

The extent of movement of the bars, and consequently of their connected rows of plungers, is regulated by a single adjusting device at each end of the bars, it resembling a ratchet-wheel, each tooth of the ratchet serving as a wedge or incline to govern the inward movement of a bar, said movement governing the amount of sugar which the mold is to receive, and consequently the density of the cubes.

As each row of molds arrives in position to have the cubes of sugar discharged therefrom upon an apron a rake is automatically operated to touch and detach the cubes and place them in line upon the said apron.

Figure 1:
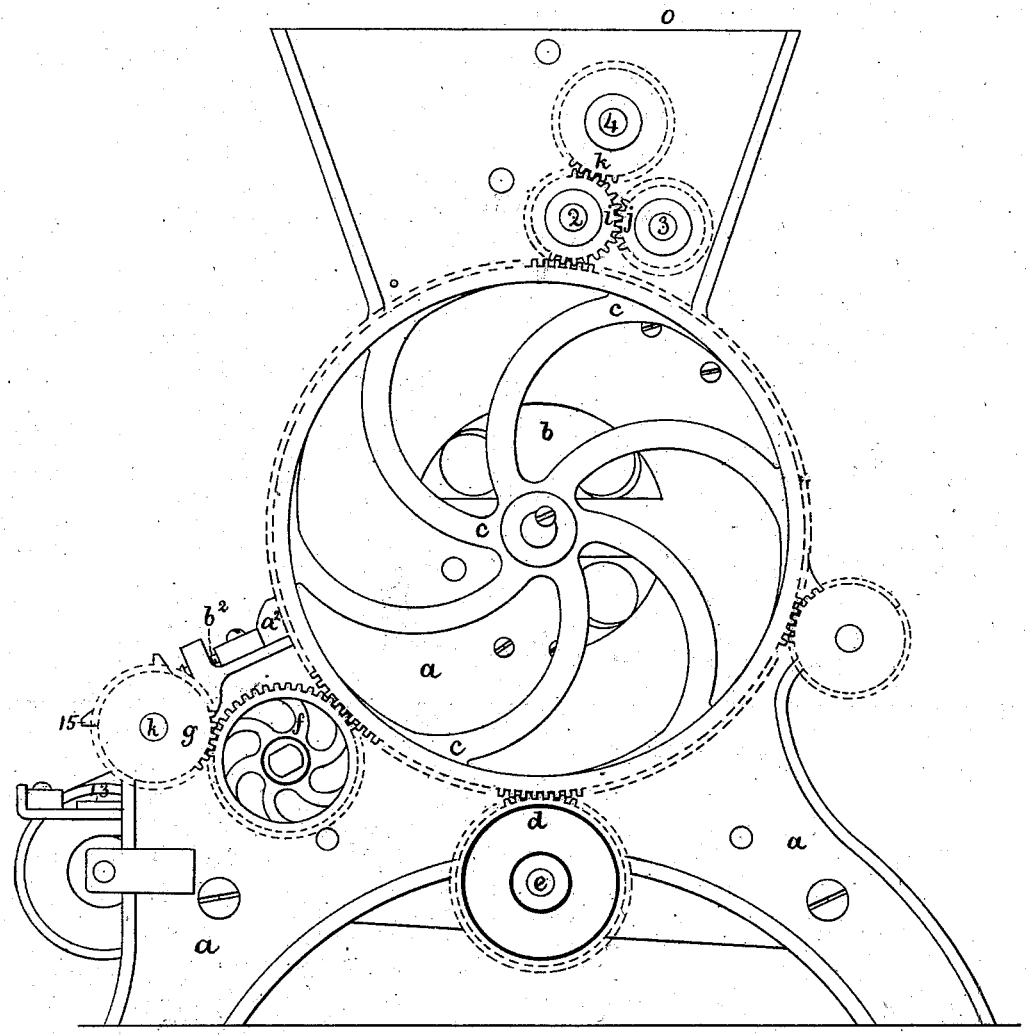
Figure 2:
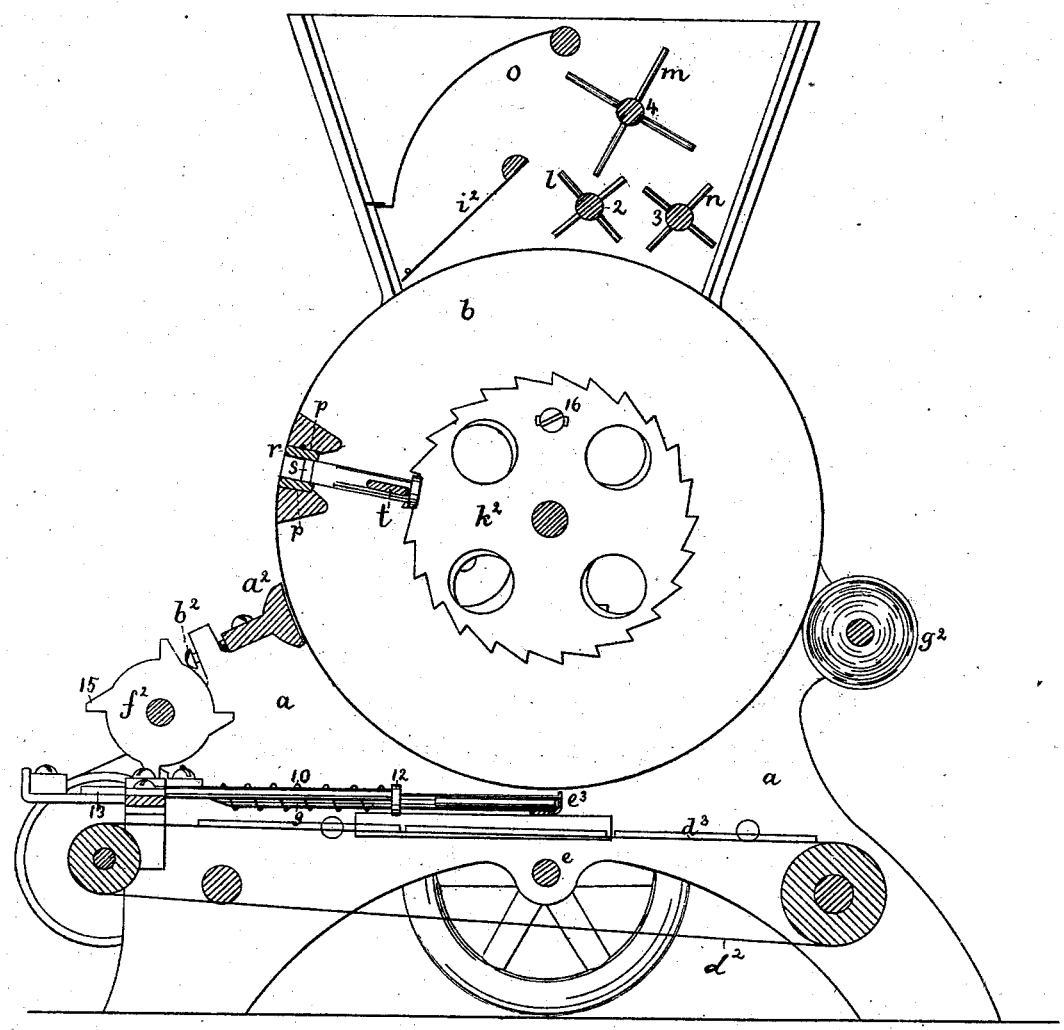
Figure 3:
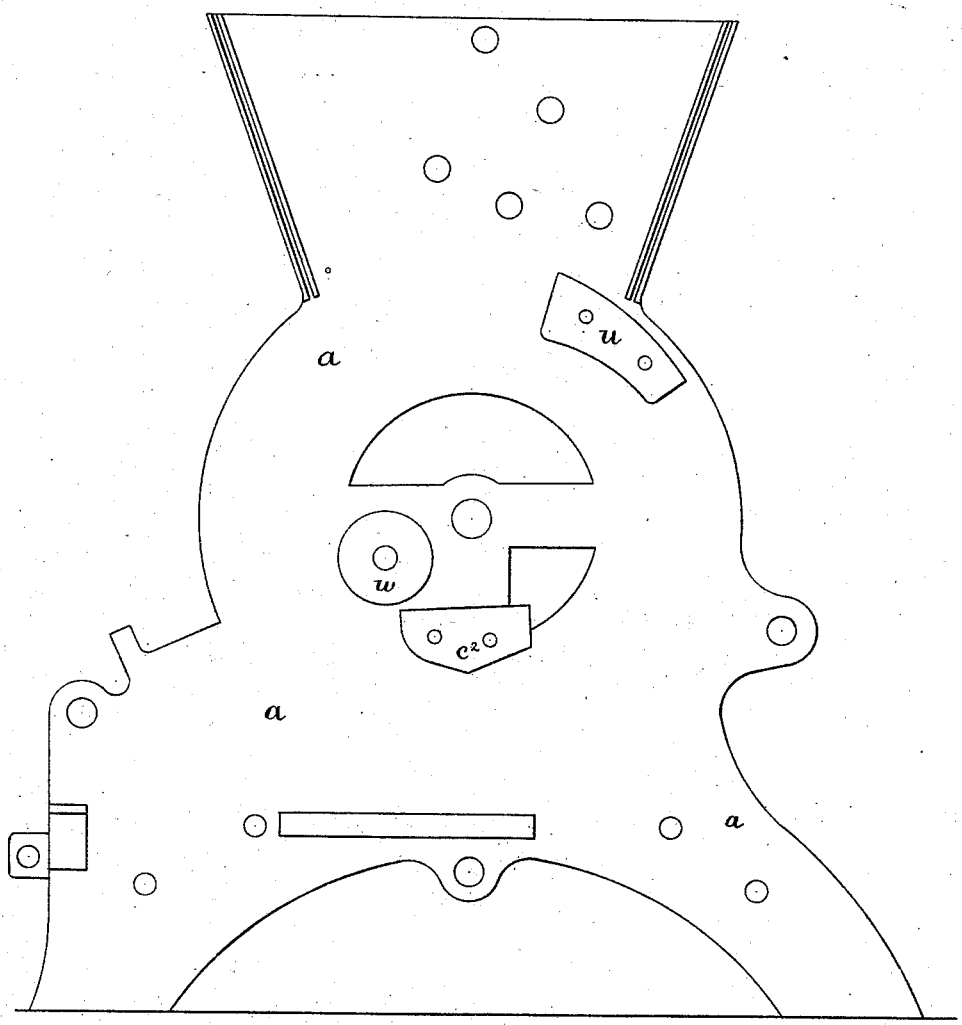
Figure 4:
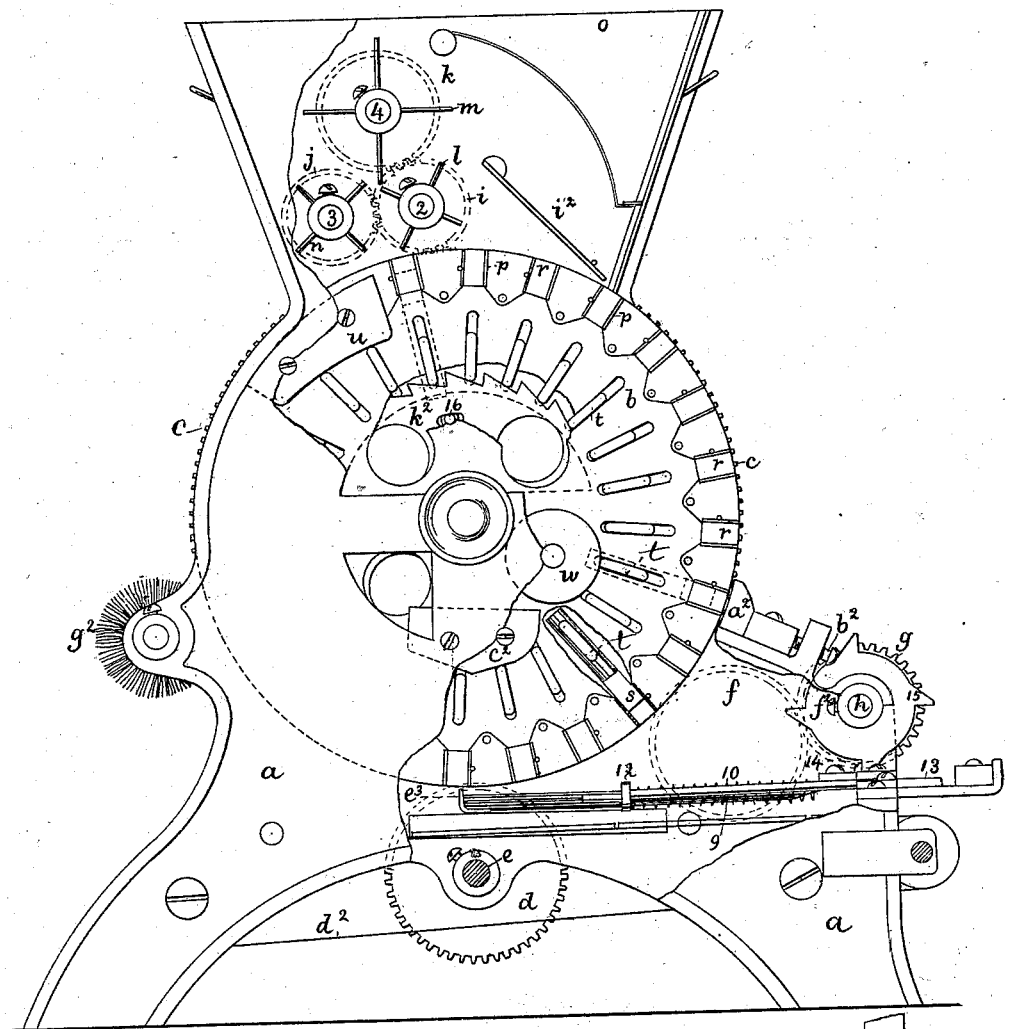
Figure 7:
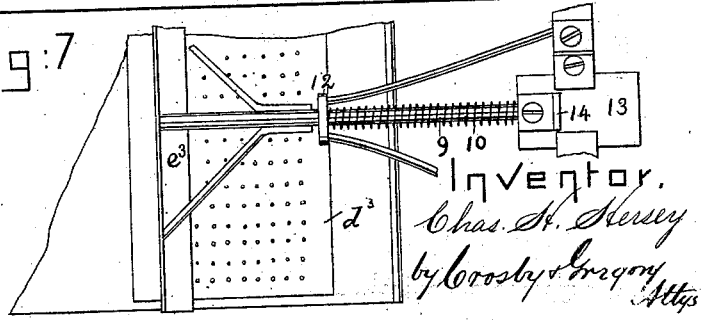
Figure 5:
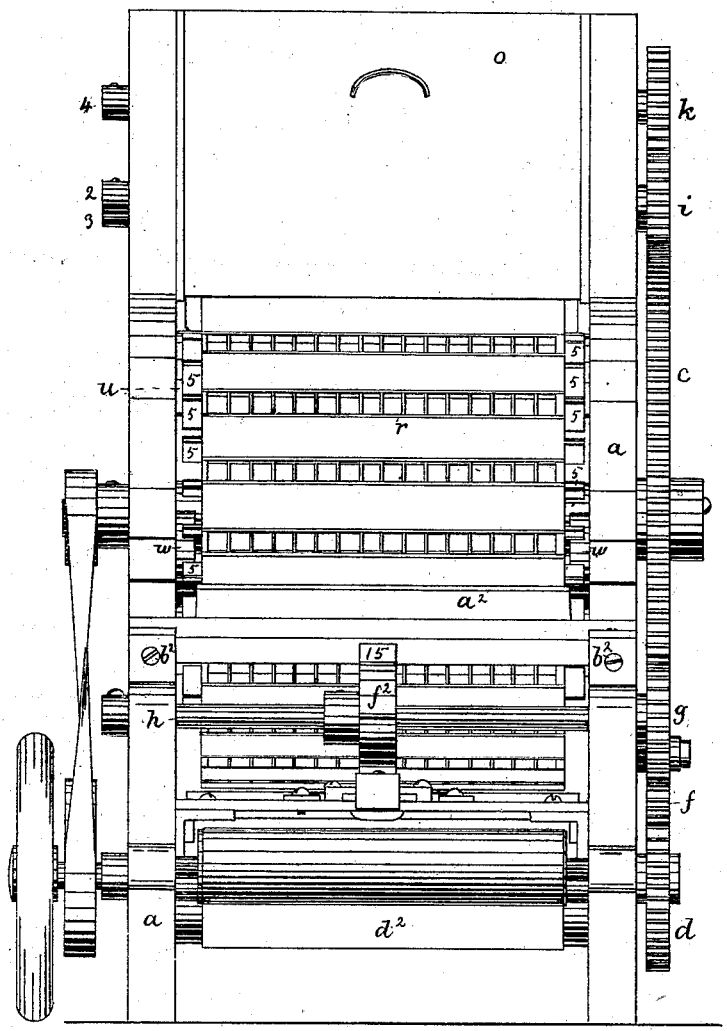
Figure 6:
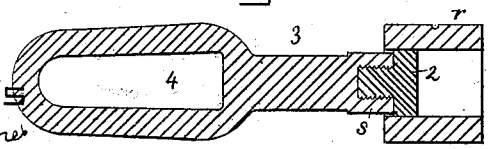

Figure 1 represents, in side elevation, a sugar-molding machine provided with my invention; Fig. 2, a section thereof, showing one of the molds in section; Fig. 3, an inside view of one of the end frame-plates of the machine, showing the actuating-cams attached thereto; Fig. 4, an elevation, showing the side opposite to that shown in Fig. 1, parts being broken away and in section, the drawing showing the full complement of molds; Fig. 5, an end elevation of Fig. 4; Fig. 6, a detail, showing one of the plungers and its mold enlarged; Fig. 7, a top view of the rake and connecting parts attached, and also a top view of one of the perforated trays upon which the sugar is discharged.

The frame-work $a$ is of proper shape to sustain the working parts. The mold-carrying drum $b$, having its journals supported in suitable bearings in the side frames, is rotated through the toothed gear $c$, and the pinion $d$ on the shaft $e$ set in motion in any desired way.

The gear $c$ engages an intermediate, $f$, which, in engagement with gear $g$, drives the cam-shaft $h$. The gear $c$ also engages and drives the gear $i$, which, in turn, drives the gears $j$ $k$ on the shafts 2 3 4 of the rotary distributers $l$ $m$ $n$, located in the hopper $o$, in which the moist sugar is placed.

The drum $b$ has about its periphery a series of transverse guiding-slots, between the walls $p$ of which are placed a series of molds, $r$, some of which are shown in section, into which the moist sugar is crowded by the distributers $l$ $n$.

Each mold has for its bottom a plunger, $s$, fitted to slide radially with relation to the drum. Each plunger is composed of a steel block, 2, for a face, and a stem or shank, 3, having an eye or passage, 4, to embrace a movable bar or carriage, $t$, about which all the plungers in any one row are strung, so that when the ends 5 of the said bars $t$, (see Fig. 5,) which extend out beyond the sides of the drum, in the rotation of the drum, strike the cam $u$, fixed to the frame-work within one or both of its sides, the said bar and all its plungers are drawn down, leaving the series of molds $r$ to be filled, and when the ends of the said bars, in the further rotation of the drum, strike the rollers $w$, one being fixed to each side frame, the said bars are moved outwardly, causing the plungers to advance into the molds and compress the sugar therein into perfect cubes, the sugar being held in place at the opposite ends of the mold by the stationary but adjustable presser-plate $a^2$, (see Fig. 4,) extended across the frame close to the surface of the drum, the face of the said presser covering all the molds of the series or row of molds opposite it. The screws $b^2$ adjust the presser-bar. After pressing the sugar into cubes the rear ends of the bars pass beyond the high parts of the rollers $w$, permitting the plungers to recede a little, so as not to force the sugar cubes out of the plungers as the outer faces of the molds move beyond the presser. In the further rotation of the drum the ends 5 of the bars strike the cams $c^2$ and force the plungers so far out as to discharge the sugar cubes therefrom upon removable plates or trays $d^3$, placed on an endless traveling apron or belt, $d^2$, kept in position and moved in any usual way. The cubes of sugar, if they do not stick to the edge of the mold, will all be placed in a row; but should any stick they will fall on the belt $d^2$ or apron back of the others.

To place the cubes all in a row the rake $e^3$ has been added. This rake has a stem, 9, surrounded by a spiral spring, 10, and guided in a suitable bracket, 12, and a flat plate, 13, at the outer end of the rod, which is provided with a lug, 14. This lug is acted upon after each row or series of molds has been emptied by one of the toes 15 of the tappet $f^2$, and is thrown forward to place all the cubes in a line upon the apron, or to detach any cubes which may adhere to the mold, or which may not be properly formed.

The plungers remain with their outer faces flush with the outer ends of the molds until after they pass the washer-roller $g^2$, which may be either a roller covered with cloth, as in Fig. 2, or a brush-roller, as in Fig. 4, to clean the plungers, after which the plungers are again drawn back or in by the cams $u$.

The distributers $l\ m\ n$ keep the moist sugar agitated, and assist in loading it into the molds when under them; but on arriving at the packer $i^2$ the sugar is, by the rotation of the drum under it, crowded down into the molds, the plungers then being held against reciprocation, and the surplus sugar is scraped from the tops of the molds and caused to travel back over the packer $i^2$.

In order to regulate the density or amount of sugar to be contained in each cube I have adjustably attached to each end of the drum, by suitable screws 16, a ratchet-toothed adjusting device, $k^2$, the inclined face of each tooth acting as a wedge-shaped support for one end, 5, of one of the bars or carriages $t$, permitting the said bars and plungers to descend for a certain defined distance more or less remote from the lower end of the molds.

This machine is easily operated, and rapidly forms the moist sugar into perfect cubes with sides and ends at right angles; and, if desired, the plungers may be made to brand the cubes with a letter or trade-mark.

I do not broadly claim a mold with a movable plunger, or a series of molds on a traveling frame or platform, for such devices are old in other arts than sugar-making.

The trays $d^3$ will preferably be made of metal, and be perforated, as shown in Fig. 7, to permit air to come against the under sides of the cubes as the trays removed from the apron by hand are set away for the sugar to dry.

I claim—

1. In a sugar-molding machine, the rotary drum and series of molds, combined with the hopper and distributers, and the packer $i^2$, inclined toward and located to fill the molds, substantially as described.

2. In a sugar-molding machine, a drum carrying a series of transverse rows of molds open at both ends, and plungers to move in said molds, having shanks provided with eyes or loops, combined with bars or carriages, each one entering all the said eyes or loops of one transverse row, and with cams to operate the said bar to move all the plungers of one transverse row simultaneously.

3. The combination, with the molds, plungers, and endless apron, of the rake to move the material shaped in the molds into a line upon the apron and means to automatically move it forward as each row of molds comes in position to deposit its molded sugar, substantially as described.

4. The combination of the drum and its attached ratchet-toothed adjusting devices with the plungers and their carrying-bars, substantially as and for the purpose set forth.

In testimony whereof I have signed my name to this specification in the presence of two subscribing witnesses.

CHAS. H. HERSEY.

Witnesses:
G. W. GREGORY,
L. F. CONNOR.